US011025740B2

(12) United States Patent
Arsenault et al.

(10) Patent No.: US 11,025,740 B2
(45) Date of Patent: *Jun. 1, 2021

(54) EDGE CACHE SEGMENT PREFETCHING (71) Applicant: The DIRECTV Group, Inc., El Segundo, CA (US)

(72) Inventors: Robert G. Arsenault, Redondo Beach, CA (US); Denny Lai, Redondo Beach, CA (US); Thai Lam, Cypress, CA (US); Michael A. Makhijani, Playa Vista, CA (US)

(73) Assignee: THE DIRECTV GROUP, INC., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/827,093

(22) Filed: Mar. 23, 2020

(65) Prior Publication Data
US 2020/0220944 A1    Jul. 9, 2020

Related U.S. Application Data (63) Continuation of application No. 15/440,387, filed on Feb. 23, 2017, now Pat. No. 10,601,946.

(51) Int. Cl.
*G06F 15/177* (2006.01)
*H04L 29/08* (2006.01)
*H04L 29/06* (2006.01)

(52) U.S. Cl.
CPC ...... *H04L 67/2847* (2013.01); *H04L 65/4084* (2013.01); *H04L 65/602* (2013.01); *H04L 65/608* (2013.01); *H04L 67/02* (2013.01)

(58) Field of Classification Search
CPC . H04L 67/2847; H04L 67/02; H04L 65/4084; H04L 65/602; H04L 65/608
USPC ......................................................... 709/220
See application file for complete search history.

(56) References Cited

U.S. PATENT DOCUMENTS

| 6,076,107 | A  | * | 6/2000  | Chen ................... H04L 41/0213 709/202 |
| 6,223,188 | B1 | * | 4/2001  | Albers .................... G06F 3/167 715/205 |
| 6,560,605 | B2 | * | 5/2003  | Albers .................... G06F 3/167 |
| 8,270,473 | B2 | * | 9/2012  | Chen .................... H04N 19/132 375/240.03 |
| 8,396,114 | B2 | * | 3/2013  | Gu ........................ H04N 19/61 375/240.01 |
| 8,548,048 | B2 | * | 10/2013 | El-Maleh ............. H04N 19/198 375/240.05 |

(Continued)

OTHER PUBLICATIONS

Ali Gouta, "Catching and prefetching for efficient video services in mobile networks." Diss. Rennes 1, 2015, 127 pages. https://hal.inria.fr/tel-01256966/file/GOUTA_Ali.pdf.

(Continued)

*Primary Examiner* — Alicia Baturay (57) ABSTRACT

Devices, computer-readable media, and methods for preloading video chunks of a video program at an edge server are disclosed. For example, a processor may receive a manifest file for a video program, determine a bitrate for a first segment of the video program, request a video chunk of the first segment at the first bitrate from an edge server in accordance with the manifest file, and request a subset of a video chunk of a second segment of the video program from the edge server.

20 Claims, 5 Drawing Sheets

(56) References Cited

U.S. PATENT DOCUMENTS

| | | | |
|---|---|---|---|
| 9,161,013 B2* | 10/2015 | Oyman | H04L 65/608 |
| 9,253,231 B2* | 2/2016 | O'Callaghan | H04L 65/80 |
| 9,386,062 B2 | 7/2016 | Gholmieh et al. | |
| 9,401,968 B2 | 7/2016 | Liu et al. | |
| 9,418,012 B2 | 8/2016 | De Vleeschauwer et al. | |
| 9,438,444 B1 | 9/2016 | Middleton et al. | |
| 9,462,339 B2 | 10/2016 | Ramakrishnan et al. | |
| 9,516,078 B2 | 12/2016 | Catchpole et al. | |
| 9,516,084 B2* | 12/2016 | Phillips | H04L 65/4084 |
| 9,591,098 B2* | 3/2017 | Oran | H04N 21/6377 |
| 9,660,921 B2* | 5/2017 | Changuel | H04L 65/80 |
| 9,756,142 B2* | 9/2017 | Dey | H04L 67/2847 |
| 10,063,653 B2* | 8/2018 | Balakrishnan | H04L 67/2842 |
| 10,601,946 B2* | 3/2020 | Arsenault | H04L 65/608 |
| 2012/0209942 A1* | 8/2012 | Zehavi | H04L 67/2842 709/213 |
| 2013/0051220 A1* | 2/2013 | Ryshakov | H04L 1/22 370/221 |
| 2013/0262693 A1 | 10/2013 | Phillips et al. | |
| 2014/0280679 A1 | 9/2014 | Dey et al. | |
| 2015/0271226 A1* | 9/2015 | Luby | H04L 47/125 709/231 |
| 2015/0288732 A1 | 10/2015 | Phillips et al. | |
| 2015/0319214 A1 | 11/2015 | Yu et al. | |
| 2015/0350714 A1 | 12/2015 | Normile et al. | |
| 2016/0191651 A1* | 6/2016 | Balakrishnan | H04L 67/1097 709/219 |
| 2017/0019445 A1 | 1/2017 | Panje | |
| 2017/0041422 A1 | 2/2017 | Westphal | |
| 2017/0111468 A1* | 4/2017 | Ash | G06F 3/0635 |
| 2017/0295132 A1* | 10/2017 | Li | H04L 63/045 |

OTHER PUBLICATIONS

Yu-Ting Yu et al., "Congestion-aware edge catching for adaptive video streaming in information-centric networks." 12th Annual EEE Consumer Communications and Networking Conference (CCNC), 2015. pp. 588-596. http://nrldweb.cs.ucla.edu/publication/download/834/1570028151.pdf.

\* cited by examiner

EDGE CACHE SEGMENT PREFETCHING

This application is a continuation of U.S. patent application Ser. No. 15/440,387, filed on Feb. 23, 2017, now U.S. Pat. No. 10,601,946, which is herein incorporated by reference in its entirety.

The present disclosure relates generally to adaptive bitrate streaming video programs, and more particularly to devices, non-transitory computer-readable media, and methods for pre-loading video chunks of a video program at an edge server and for pre-fetching video chunks of a video program.

BACKGROUND

Video delivery technology has shifted from connection-oriented video transport protocols such as Real Time Messaging Protocol (RTMP) and Real Time Streaming Protocol (RTSP) to connectionless, e.g., Hypertext Transfer Protocol (HTTP)-based, adaptive streaming protocols, such as Moving Picture Experts Group (MPEG) Dynamic Adaptive Streaming over HTTP (DASH). A common feature of HTTP-based adaptive streaming protocols is the storage and delivery of a video program in multiple files (chunks) associated with segments of the video program and having different encoding bitrates, with the files linked together by a manifest file, or "index file" that defines all of the segments, and the available video chunks for the segments of the video program.

SUMMARY

In one example, the present disclosure describes a device, computer-readable medium and method for pre-loading video chunks of a video program at an edge server. For instance, in one example, a processor may receive a manifest file for a video program, determine a bitrate for a first segment of the video program, request a video chunk of the first segment at the first bitrate from an edge server in accordance with the manifest file, and request a subset of a video chunk of a second segment of the video program from the edge server.

In another example, the present disclosure describes a device, computer-readable medium and method for pre-fetching video chunks of a video program. For instance, a processor may receive, from a client device, a request for a video chunk of a first segment of a video program encoded at a first bitrate, retrieve the video chunk of the first segment in response to the request, and retrieve a plurality of video chunks of at least a second segment at a plurality of bitrates from a source device in response to the request. The processor may also transmit the video chunk of the first segment to the client device and store the video chunks of the at least the second segment at the device.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

A content delivery network (CDN) provides better video quality (shorter startup time, less video buffering ratio, etc.) when video data is delivered from CDN edge servers, closer to consuming customers. In theory, a CDN can provision large storage at all edge servers, but this may not be economical. An origin server may host from 10,000 to 100,000 video programs, where each video program may be comprised of from 100,000 to 600,000 component files, or video chunks, based on the video runtime. In comparison, an edge server, or "edge cache", typically holds far fewer files serving multiple tenants' file delivery purposes, including adaptive bitrate streaming video programs, as well as other file types, such as webpages, documents, etc. The current reverse proxy mechanism caches only popular titles in edge caches; long tail titles may suffer from less than optimum delivery quality, such as long startup time and high buffering ratio. For instance, a CDN may manage the finite storage capacity of an edge cache by keeping popular content in the edge cache, evicting less popular titles using a Least Recently Used (LRU) algorithm when the cache is full. LRU is a popular algorithm for the CDN, but may not work best for the content provider. A content provider may have a preferred video it wants to be in the edge cache, such as a pay-per-view (PPV) video, or a high resolution video such as a 4K title. In addition, the preferred titles may not be the popular titles in terms of customer download requests. Secondly, the LRU algorithm only helps maintain frequently and continuously requested files in the CDN cache and does not help the experience of the customer first requesting a particular file from the CDN cache/edge server.

Examples of the present disclosure enable a CDN to serve all titles with reduced delays to the customers, both popular and long tail, directly from CDN edge cache. Thus produces a better video delivery experience for the customers. In particular, examples of the present disclosure deliver video programs with reduced latency time to initiate a video playback experience, as well as reduce buffering while playing back the video. In one example, a client device may trigger a CDN edge server to preload video chunks for the next N segments of a video program, for example, two segments of a video program, into the edge server, before the client device actually requests the video chunks. No bandwidth to the client device is used to retrieve the pre-fetched video chunks until such a time as the client device is ready to pull the video chunks into the client device's video buffer. When the video chunks are in fact requested, the video chunks may already be stored at the CDN edge server. In one example, the client device causes the CDN edge server the preload the video chunks a split second to just a few seconds before it is anticipated that delivery of the video chunks to the client device will be requested, such as 0.5 to 4 seconds prior to the anticipated request. In one example, a pre-fetch window may be empirically determined for the particular application and then maintained in use. For example, video chunks for the upcoming next 4 seconds of segments of the video program may be maintained as pre-fetched in the edge server beyond the segment currently requested by the client device for actual delivery. In another example, the window and pre-fetch time is dynamically adjusted to optimize the customer experience.

In accordance with the foregoing, in one example a client side application, e.g., an adaptive bitrate streaming video player, may signal to a CDN edge server of the upcoming video chunks. That is, in addition to requesting a video chunk for a segment, the client device/application may also signal, but does not request, video chunks for the next X subsequent segments at the requested bitrate and its adjacent bitrate(s). In one example, the present disclosure may be referred to as a pre-fetch proxy, which may comprise a new feature added to the client device video player, or a feature of the application or operating system of the client device. In another example, a CDN edge server, upon being requested to provide a segment N of bitrate B, in addition to fulfilling the request may also request video chunks of the next X subsequent segments at the requested bitrate and its adjacent bitrates. In this example, a client application may continue to function without modification, while enjoying the advantages of the present disclosure through enhancements to the CDN edge server. In either example, the implementations help to guarantee the availability at the edge server of video chunks anticipated to be requested in the near future, without overloading the edge server with the entire or nearly the entire video program.

It should be noted that in a different example, a CDN edge cache could pre-load all video chunks of a video program in response to a request for a manifest file or in response to a request for a video chunk of a first segment. However, this is inefficient because not all users may watch the entire video program. In addition, an aggressive LRU algorithm could delete video chunks for upcoming segments before requested by the client device, due to the long runtime of many videos and the finite storage limits at the edge cache. In contrast, examples of the present disclosure pull video chunks from the next one or several segments, and from plus or minus one, or plus or minus two adjacent bitrates. Thus, the wasted bandwidth/overhead if a user stops viewing the video program is limited to the one to several segment "look-ahead" window.

Another solution involves continuous pulling with client simulators to keep preferred content in the edge cache. This process is resource intensive as it requires multiple client simulators downloading content from the CDN. In addition, if used to download all available content, the total storage required for all content may exceed the edge cache capacity. Thus, the simulated download titles may evict each other out of the edge cache. In contrast, examples of the present disclosure leverage the sequential data structure into which video programs are segmented to enable the streaming of both popular and long tail video programs directly from CDN edge servers to client devices, without incurring the expensive cost of storing of entire video programs in the CDN edge servers. Examples of the present disclosure improve the client playout bitrate and startup time, and reduce the buffering ratio, to the extent similar to where all content is stored at the CDN edge servers. These and other aspects of the present disclosure are described in greater detail below in connection with the examples of FIGS. 1-5.

Figure 1:
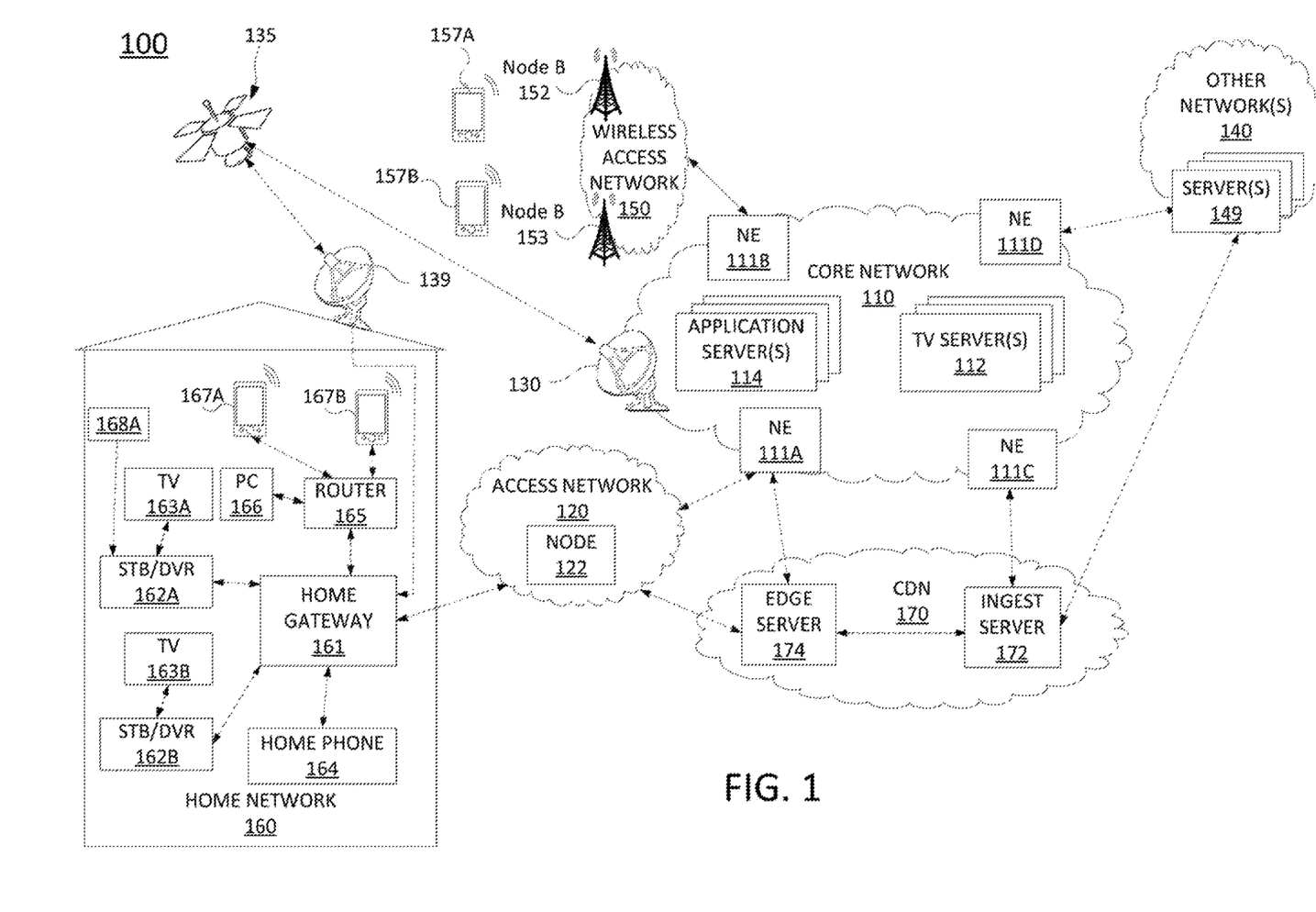
FIG. 1 illustrates an example network related to the present disclosure.

To better understand the present disclosure, FIG. 1 illustrates an example network 100, related to the present disclosure. As shown in FIG. 1, the network 100 connects mobile devices 157A, 157B, 167A and 167B, and home network devices such as home gateway 161, set-top boxes (STBs) 162A and 162B, television (TV) 163A and TV 163B, home phone 164, router 165, personal computer (PC) 166, and so forth, with one another and with various other devices via a core network 110, a wireless access network 150 (e.g., a cellular network), an access network 120, other networks 140, content distribution network (CDN) 170, and/or the Internet in general. For instance, connections between core network 110, access network 120, home network 160, CDN 170, wireless access network 150 and other networks 140 may comprise the Internet in general, internal links under the control of single telecommunication service provider network, links between peer networks, and so forth.

In one embodiment, wireless access network 150 comprises a radio access network implementing such technologies as: Global System for Mobile Communication (GSM), e.g., a Base Station Subsystem (BSS), or IS-95, a Universal Mobile Telecommunications System (UMTS) network employing Wideband Code Division Multiple Access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB). In one example, wireless access network 150 may be controlled and/or operated by a same entity as core network 110.

In one example, each of mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one example, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, wireless access network 150, access network 120, and so forth. As shown in FIG. 1, core network 110 may also include a plurality of television (TV) servers 112, and a plurality of application servers 114. For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may include content server(s) to store scheduled television broadcast content for a number of television channels, video-on-demand programming, local programming content, and so forth. Alternatively, or in addition, content providers may stream various contents to the core network 110 for distribution to various subscribers, e.g., for live content, such as news programming, sporting events, and the like. Television servers 112 may also include advertising server(s) to store a number of advertisements that can be selected for presentation to viewers, e.g., in the home network 160 and at other downstream viewing locations. For example, advertisers may upload various advertising content to the core network 110 to be distributed to various viewers. Television servers 112 may also include interactive TV/video-on-demand (VOD) server(s), as described in greater detail below.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other type of television service to subscribers via access network 120. In this regard, access network 120 may include a node 122, e.g., a mini-fiber node (MFN), a video-ready access device (VRAD) or the like. However, in another example, node 122 may be omitted, e.g., for fiber-to-the-premises (FTTP) installations. Access network 120 may also transmit and receive communications between home network 160 and core network 110 relating to voice telephone calls, communications with web servers via other networks 140, content distribution network (CDN) 170 and/or the Internet in general, and so forth. In another example, access network 120 may be operated by a different entity from core network 110, e.g., an Internet service provider (ISP) network.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

As illustrated in FIG. 1, core network 110 may include various application servers 114. For instance, application servers 114 may be implemented to provide certain functions or features, e.g., a Serving-Call Session Control Function (S-CSCF), a Proxy-Call Session Control Function (P-CSCF), or an Interrogating-Call Session Control Function (I-CSCF), one or more billing servers for billing one or more services, including cellular data and telephony services, wire-line phone services, Internet access services, and television services. Application servers 114 may also include a Home Subscriber Server/Home Location Register (HSS/HLR) for tracking cellular subscriber device location and other functions. An HSS refers to a network element residing in the control plane of an IMS network that acts as a central repository of all customer specific authorizations, service profiles, preferences, etc. Application servers 114 may also include an IMS media server (MS) for handling and terminating media streams to provide services such as announcements, bridges, and Interactive Voice Response (IVR) messages for VoIP and cellular service applications. The MS may also interact with customers for media session management. In addition, application servers 114 may also include a presence server, e.g., for detecting a presence of a user. For example, the presence server may determine the physical location of a user or whether the user is "present" for the purpose of a subscribed service, e.g., online for a chatting service and the like. In one example, application servers 114 may include data storage servers to receive and store manifest files regarding adaptive bitrate streaming video programs maintained within TV servers 112 and/or available to subscribers of core network 110 and stored in server(s) 149 in other networks 140. It should be noted that the foregoing are only several examples of the types of relevant application servers 114 that may be included in core network 110 for storing information relevant to providing various services to subscribers.

In accordance with the present disclosure, other networks 140 and servers 149 may comprise networks and devices of various content providers of adaptive bitrate streaming video programs. In one example, each of servers 149 may also make available manifest files which describe the segments and/or video chunks of various video programs stored on the respective one of the servers 149. In particular, a segment may comprise a portion of a video program, such as a 2-10 second portion, for example. A video chunk may comprise an actual data file containing video and/or audio for a segment that is encoded at a particular bitrate. For instance, there may be several video chunks containing video and audio for the same segment of the video program, but which are encoded at different bitrates in accordance with an adaptive bitrate streaming protocol. Thus, an adaptive bitrate streaming video player may request and obtain any one of the different video chunks for a segment, e.g., depending upon a state of a video buffer of the adaptive bitrate streaming video player, depending upon network conditions, depending upon the access rights of the adaptive bitrate streaming video player to different encoding bitrates according to a subscription plan and/or for the particular video program, and so forth.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

Figure 3:
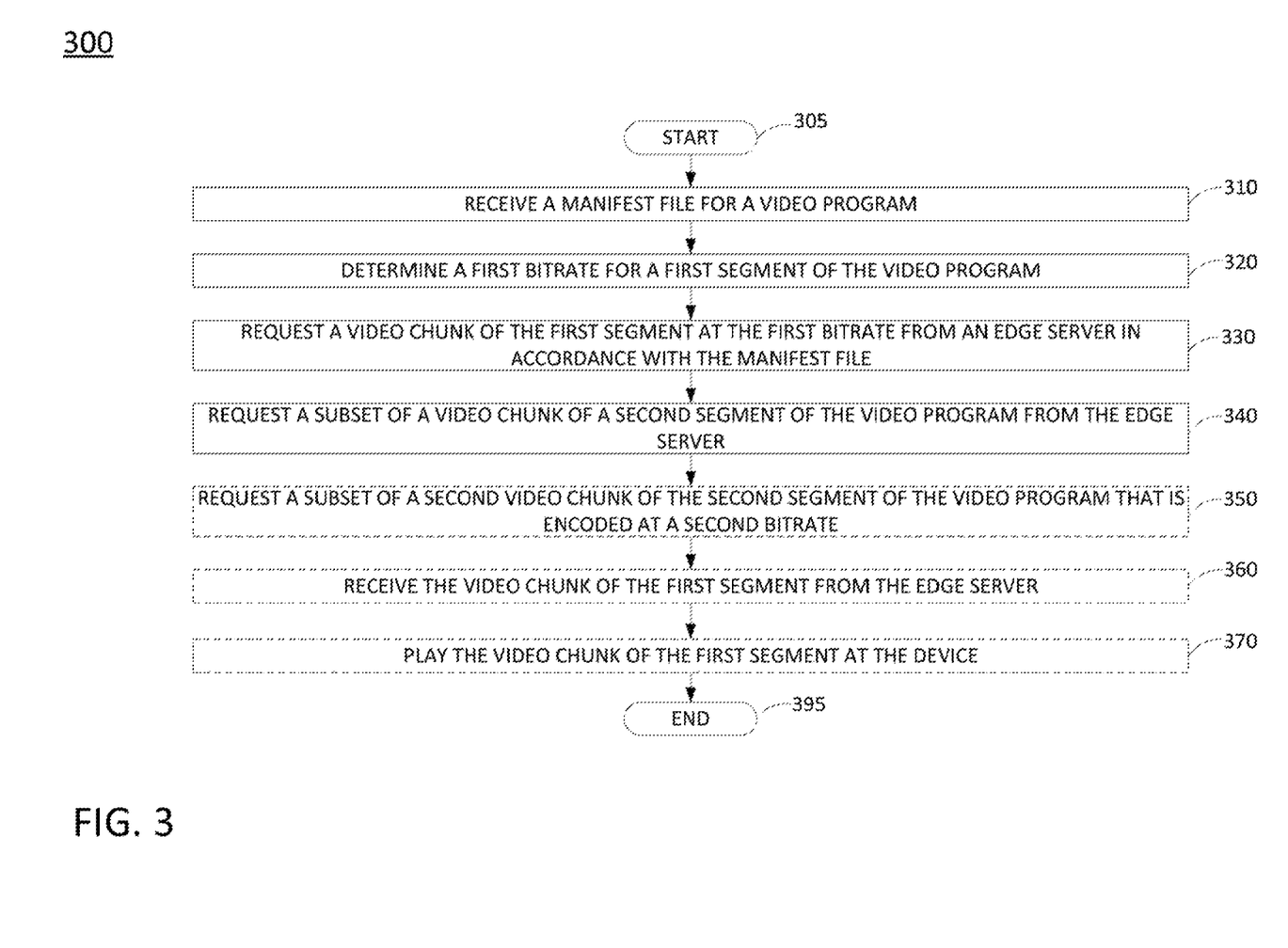
FIG. 3 illustrates a flowchart of an example method for pre-loading video chunks of a video program at an edge server.
Figure 5:
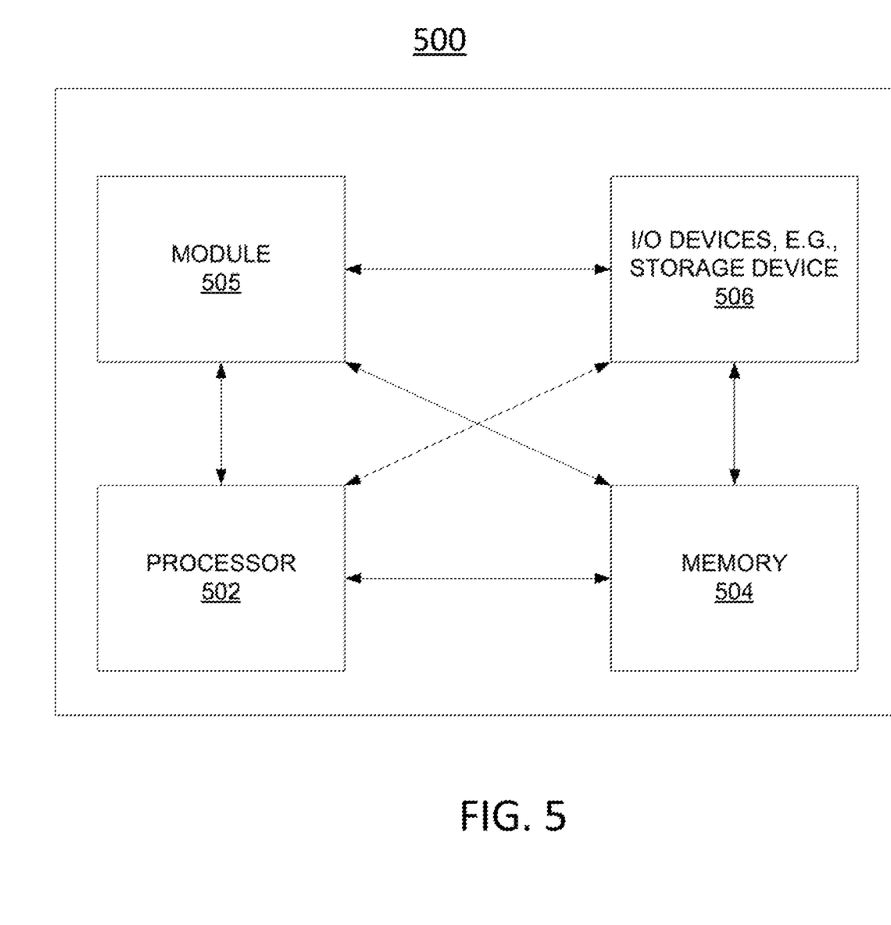
FIG. 5 illustrates a high level block diagram of a computing device specifically programmed to perform the steps, functions, blocks and/or operations described herein.

In one example, one or both of the STB/DVR 162A and STB/DVR 162B may comprise a computing system or server, such as computing system 500 depicted in FIG. 5, and may be configured to provide one or more operations or functions for pre-loading video chunks of a video program at an edge server. Among other functions, STB/DVR 162A and STB/DVR 162B may comprise adaptive bitrate streaming video players capable of playing adaptive bitrate streaming video programs in formats such as Moving Picture Expert Group (MPEG) .mpeg files, .mov files, .mp4 files, .3gp files, .f4f files, .m3u8 files, or the like. It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. A flowchart of an example method of pre-loading video chunks of a video program at an edge server is illustrated in FIG. 3 and described in greater detail below. Although STB/DVR 162A and STB/DVR 162B are illustrated and described as integrated devices with both STB and DVR functions, in other, further, and different examples, STB/DVR 162A and/or STB/DVR 162B may comprise separate STB and DVR devices.

It should be noted that in one example, another device may provide one or more operations or functions for pre-loading video chunks of a video program at an edge server, as described herein, and may comprise adaptive bitrate streaming video players capable of playing adaptive bitrate streaming video programs. For instance, one or more of mobile devices 157A, 157B, 167A and 167B, and/or PC 166 may also comprise a computing system, such as computing system 500 depicted in FIG. 5, and may be configured to provide one or more operations or functions for pre-loading video chunks of a video program at an edge server, as described herein.

Figure 4:
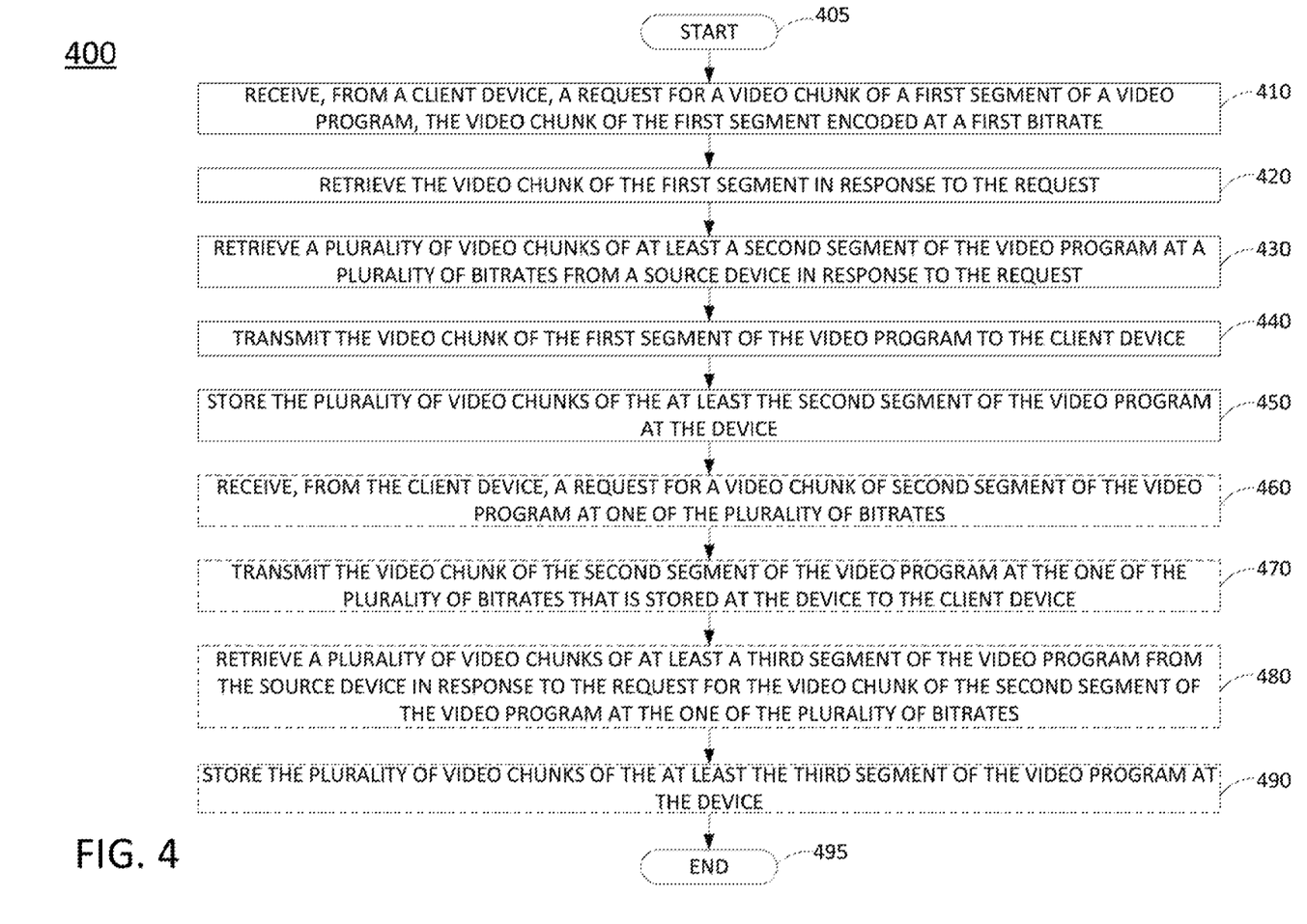
FIG. 4 illustrates a flowchart of an example method for pre-fetching video chunks of a video program.

Network 100 may also include a content distribution network (CDN) 170. In one example, CDN 170 may be operated by a different entity from core network 110. In another example, CDN 170 may be operated by a same entity as core network 110, e.g., a telecommunication service provider. In one example, the CDN 170 may comprise a collection of cache servers distributed across a large geographical area and organized in a tier structure. The first tier may comprise a group of servers that access content web servers (origin servers) to pull content into the CDN 170, referred to as an ingestion servers, e.g., ingest server 172. The content may include video programs, content of various webpages, electronic documents, video games, etc. A last tier may comprise cache servers which deliver content to end user, referred to as edge caches, or edge servers, e.g., edge server 174. For ease of illustration, a single ingest server 172 and a single edge server 174 are shown in FIG. 1. In between the ingest server 172 and edge server 174, there may be several layers of servers (omitted from the illustrations), referred to as the middle tier. In one example, the edge server 174 may be multi-tenant, serving multiple content providers, such as core network 110, content providers associated with server(s) 149 in other network(s) 140, and so forth. In one example, edge server 174 may comprise an adaptive bitrate streaming video server. In addition, in one example, edge server 174 may comprise a computing system or server, such as computing system 500 depicted in FIG. 5, and may be configured to provide one or more operations or functions for pre-fetching video chunks of a video program. A flowchart of an example method of pre-fetching video chunks of a video program is illustrated in FIG. 4 and described in greater detail below.

As mentioned above, TV servers 112 in core network 110 may also include one or more interactive TV/video-on-demand (VOD) servers. In one example, an interactive TV/VOD server may comprise a computing system or server, such as computing system 500 depicted in FIG. 5, and may be configured to provide one or more operations or functions to support pre-loading video chunks of a video program at an edge server and/or pre-fetching video chunks of a video program, as described herein. Among other things, an interactive TV/VOD server may function a server for STB/DVR 162A and/or STB/DVR 162B, one or more of mobile devices 157A, 157B, 167A and 167B, and/or PC 166 operating as a client for requesting and receiving a manifest file for an adaptive bitrate streaming video program, as described herein. For example, STB/DVR 162A may present a user interface and receive one or more inputs (e.g., via remote control 168A) for a selecting of an adaptive bitrate streaming video program. STB/DVR 162A may request the video program from an interactive TV/VOD server, which may retrieve the manifest file for the video program from one or more of application servers 114 and provide the manifest file to STB/DVR 162A. STB/DVR 162A may then obtain video chunks of video segments of the video program as identified in the manifest file.

In one example, the manifest file may direct the STB/DVR 162A to obtain the video chunks from edge server 174 in CDN 170. The edge server 174 may already store the video chunks of the video program and may deliver the video chunks upon a request from the STB/DVR 162A. However, if the edge server 174 does not already store the video chunks, upon request from the STB/DVR 162A, the edge server 174 may in turn request the video chunks from an origin server. The origin server which stores chunks of the video program may comprise, for example, one of servers 149 or one of TV servers 112. The chunks of the video program may be obtain from an origin server via ingest server 172 before passing to edge server 174. In one example, the ingest server 172 may also pass the video chunks to other middle tier servers and/or other edge servers (not shown) of CDN 170. The edge server 174 may then deliver the video chunks to the STB/DVR 162A and may store the video chunks until the video chunks are removed or overwritten from the edge server 174 according to any number of criteria, such as a least recently used (LRU) algorithm for determining which content to keep in the edge server 174 and which content to delete and/or overwrite.

It should be noted that a similar process may involve other devices, such as TV 163A or TV 163B (e.g., "smart" TVs), mobile devices 176A, 167B, 157A or 157B obtaining a manifest file for a video program from one of TV servers 112, from one of servers 149, etc., and requesting and obtaining video chunks of the video program from edge server 174 of CDN 170. In this regard, it should be noted that edge server 174 may comprise a server that is closest to the requesting device geographically or in terms of network latency, throughput, etc., or which may have more spare capacity to serve the requesting device as compared to other edge servers, which may otherwise best serve the video program to the requesting device, etc. However, depending upon the location of the requesting device, the access network utilized by the requesting device, and other factors, the chunks of the video program may be delivered via various networks, various links, and/or various intermediate devices. For instance, in one example, edge server 174 may deliver video chunks to a requesting device in home network 160 via access network 120, e.g., an ISP network. In another example, edge server 174 may deliver video chunks to a requesting device in home network 160 via core network 110 and access network 120. In still another example, edge server 174 may deliver video chunks to a requesting device such as mobile device 157A or 157B via core network 110 and wireless access network 150.

Further details regarding the functions that may be implemented by edge server 174, STBs/DVRs 162A and 162B, mobile devices 157A, 157B, 167A and 167B, and/or PC 166 are discussed in greater detail below in connection with the examples of FIGS. 2-5. In addition, those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 2:
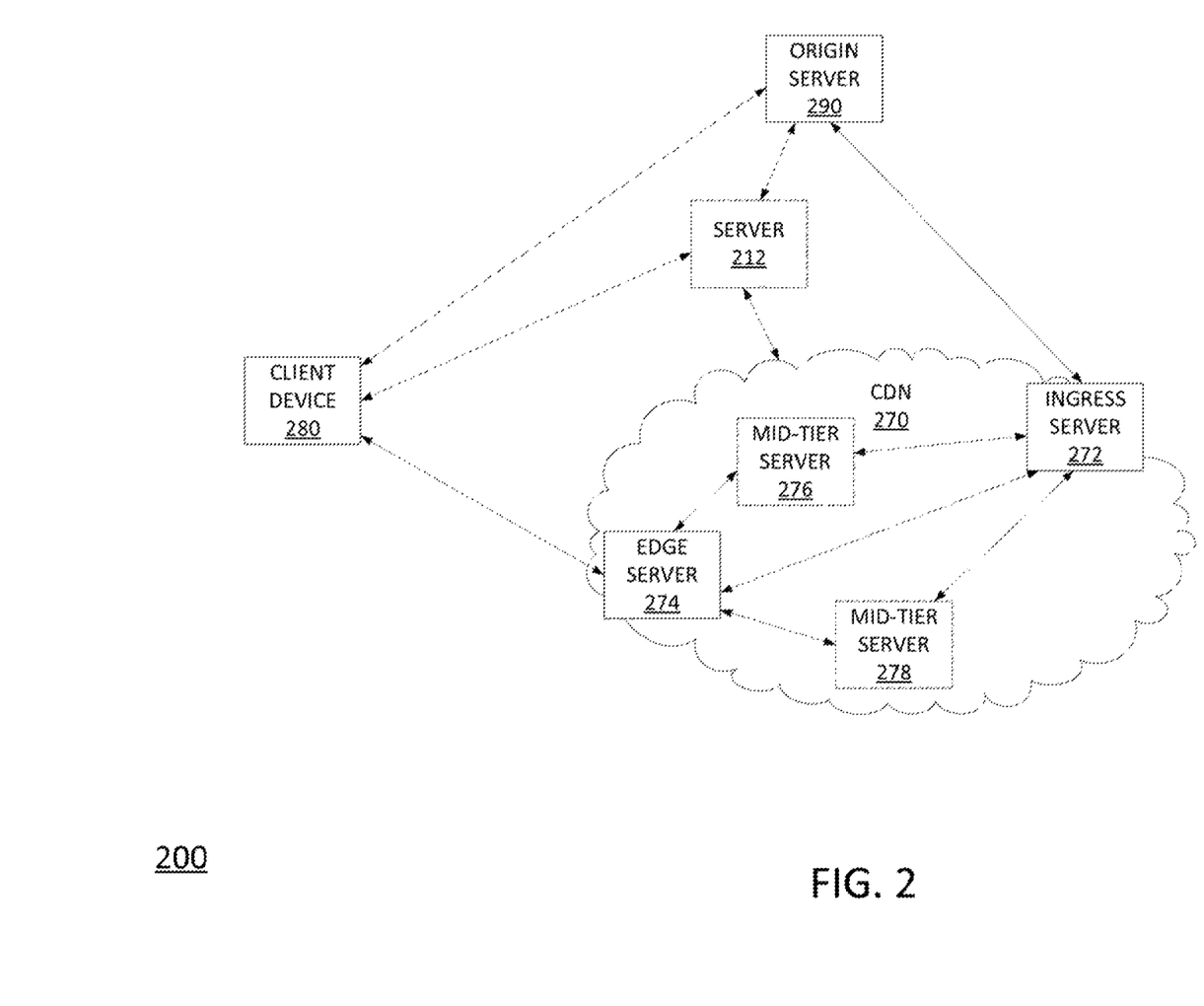
FIG. 2 illustrates an example system in accordance with the present disclosure.

FIG. 2 illustrates an example system 200 according to the present disclosure. As illustrated in FIG. 2, the system 200 includes a content distribution network (CDN) 270, a client device 280, and an origin server 290. The CDN 270 may be the same or similar to the CDN 170 in FIG. 1. The client device 280 may comprise any number of devices such, as a set-top box (STB), a smart TV, a desktop computer, a laptop computer, a tablet, a smartphone, or the like that includes functionality of an adaptive bitrate streaming video client. The origin server 290 may be operated by a same entity or a different entity as CDN 270 and may store various video programs in accordance with an adaptive bitrate streaming protocol. In other words, the origin server 290 may store a plurality of video chunks for each of a plurality of segments of a video program. In one example, the origin server 290 may also store and make available manifest files for different adaptive bitrate streaming video programs. In another example, the origin server 290 may create manifest files in response to a request for a video program from a particular client device. For instance, a different manifest file may be provided to client device 280 as compared to a different client device, e.g., depending upon the capabilities of the client device 280, based upon rights of the client device according to a subscription, purchase or rental of the video program, based upon a location of the client device 280, based upon the availability and/or capability of CDN 270 and/or edge server 274, and so forth. In another example, client device 280 may obtain a manifest file for a video program from a different source, such as server 212. For instance, server 212 may be operated by a telecommunication service provider or streaming video service provider of which a user of client device 280 is a subscriber, while origin server 290 may be associated with a content creator and/or content provider, such as a network providing broadcast and on-demand programming to subscribers of the telecommunication service provider network and/or streaming video service provider.

In one example, a manifest file for a video program may direct client device 280 to obtain video chunks of the video program from edge server 274, which may or may not already have stored copies of video chunks of the video program. The manifest file, for example, may provide uniform resource locators (URLs) and/or uniform resource identifiers (URIs) for different video chunks which resolve to the edge server 274. Thus, an adaptive bitrate streaming video client of the client device 280 may obtain the video chunks from edge server 274 as an adaptive bitrate streaming video server. However, it should be noted that in one example, edge server 274 may be unmodified but still support examples of the present disclosure for pre-loading video chunks of a video program at an edge server, e.g., by client device 280. For instance, edge server 274 may simply obtain and/or deliver the files comprising requested video chunks like any other file stored on the edge server 274.

An example of client device 280 obtaining and playing a video program may proceed as follows. Client device 280 may have an application to browse and select a video program that is being made available by origin server 290 and/or server 212. In response to a selection of a particular video program, origin server 290 or server 212 may provide a manifest file for the video program to client device 212. For purposes of the present example, the manifest file may provide URLs for different video chunks of the video program which resolve to the edge server 274. Alternatively, or in addition, the manifest file may provide URIs for different video chunks of the video program along with instructions directing the client device 280 to request the files associated with the URIs from edge server 274.

Edge server 274 may or may not store one or more video chunks of the video program. In particular, edge server 274 may have a limited capacity and cannot store all content that may be requested by client devices that may be serviced by the edge server 274. For instance, edge server 274 may evict stale content via a least recently used (LRU) algorithm or the like. When initially receiving the manifest file, the client device 280 may request one or more video chunks of one or more segments of the video file from the edge server 274 in accordance with the manifest file. As mentioned above, a segment of a video program may have multiple video chunks associated therewith having different encoding bitrates, and hence different qualities of video and/or audio. The client device 280 may select an initial encoding bitrate based upon a variety of factors which may include: the capabilities of the client device 280, e.g., in terms of maximum processor speed, memory capacity, maximum screen resolution, etc., network conditions, such as latency, bandwidth, throughput, etc., access rights of the client device 280 to the video program, and so forth. In one example, the client device 280 may request a plurality of video chunks of the video program associated with a plurality of different sequential segments to initially fill a video buffer of the client device. For example, the video buffer may be filed so that the client device 280 may obtain further video chunks for subsequent segments of the video program at a highest bitrate sustainable per the client device capabilities and/or network conditions, to maintain the video buffer occupancy level, or to otherwise avoid a stall in the presentation of the video program.

In response to the request for one or more video chunks, the edge server 274 may first determine whether all or a portion of the requested video chunks are available at the edge server 274. If the edge server 274 already stores a requested video chunk, the edge server 274 may deliver the video chunk to the client device 280. If the edge server 274 does not possess a requested video chunk, the edge server 274 may request the video chunk from the CDN 270 and/or from the origin server 290. For instance, the edge server 274 may transmit a request to origin server 290 for the video chunk. In one example, the request may pass via ingress server 272 and/or one or more mid-tier servers, such as mid-tier servers 276 and/or 278. In one example, the request may be intercepted by one of the mid-tier servers 276 or 278, or ingress server 272. If the intercepting device has stored thereon a copy of the requested video chunk, the intercepting device may return the video chunk to edge server 274 in response to the request. Otherwise, the request may be passed to the origin server 290.

In another example, an edge server 274 may broadcast a request to peer-devices within CDN 270 to determine a closest copy of the video chunk. The edge server 274 may then obtain the video chunk from any responding device of the CDN, such as mid-tier server 276 or 278, another edge server (not shown), ingress server 272, etc. If, however, there is no device of the CDN 270 that responds, the edge server 274 may then send the request to origin server 290. In one example, the origin server 290 may return the requested video chunk(s) to ingress server 272, which may forward the video chunk(s) to edge server 274, and which may also store the video chunk(s) and/or distribute the video chunk(s) to other devices in CDN 270. For example, the video chunk(s) may be forwarded to edge server 274 via mid-tier server 276, which may store the video chunk(s) before or at the same time as passing the video chunk(s) to edge server 274. Thus, if another edge server of CDN 270 requests the same video chunk(s), it may be more efficient to obtain the video chunk(s) from mid-tier server 276 than to re-populate the video chunk(s) into CDN 270 from the origin server 290.

In any event, client device 280 may obtain an initial set of one or more video chunks for one or more segments of the video program and begin playing the video program from the video buffer. As the client device 280 plays one or more of the video chunks, it may also obtain additional video chunks for subsequent segments of the video program from the edge server 274. The edge server 274 may again fulfill the request from video chunks that are already stored at edge server 274, or ma obtain the video chunks from other devices in CDN 270 and/or from origin server 290. However, it should be noted that when the video chunks are not already stored at edge server 274, a presentation of the video program at client device 280 is more susceptible to a buffer stall, delay, degradation of quality (e.g., dropping to a lower encoding bit rate), and so forth. In particular, the number of network hops, e.g., from edge server 274 to origin server 290, the distances between such devices and any intermediate devices, and so forth, may all contribute to unanticipated and/or unavoidable delays, congestion, etc.

In accordance with the present disclosure, client device 280 may cause edge server 274 to pre-load one or more video chunks into the edge server 274 (e.g., an "edge cache") prior to the client device 280 requesting actual delivery of the video chunk(s) from the edge server 274 to the client device 280. In one example, the edge server 274 may include an interface to accept a command from the client device 280 to pre-load one or more video chunks, that is, to obtain the video chunks from origin server 290 or from elsewhere in CDN 270, and to store the video chunks at edge server 274, without delivery of the video chunk(s) to the client device 280. The client device 280 may subsequently request one or more of the video chunk(s) as the client device 280 determines it is suitable to place the video chunk(s) into the video buffer of the client device 280. The edge server 274 may then be able to more quickly deliver the requested video chunk(s), i.e., without having to request the video chunk(s) from origin server 290 and/or from other devices in CDN 270.

As mentioned above, edge server 274 may also support examples of the present disclosure for pre-loading video chunks of a video program at an edge server, e.g., by client device 280, without modification. For instance, in one example the client device 280 may send a message to the edge server 274 in accordance with a Hypertext Transfer Protocol (HTTP) head method, or HTTP head request. The HTTP head method allows a client to request from a server header information associated with a file, webpage, etc. The server will return the requested information to the client, without delivering payload data. In the case of an edge server of a CDN, such as edge server 274, if the edge server 274 does not have the file for which the header information is being requested, the edge server 274 may obtain the file, extract the header information, and send the header information to the client device 280. In addition, since the edge server 274 obtains the file, the edge server 274 also stores the file. Thus, in the case of an HTTP head request pertaining to a video chunk of a video program, the HTTP head request may cause the edge server 274 to obtain and store the video chunk, which may be referred to herein as "pre-loading" or "edge loading". Although some data is transferred over the network form edge server 274 to client device 270 in response to the HTTP head request, it is negligible compared to the size of the entire video chunk. If and when the client device 280 requests delivery of the full video chunk, the video chunk may already be stored in the edge server 274 and may be delivered faster than if the edge server 274 had to retrieve the video chunk from the origin server 290 or elsewhere within CDN 270.

In another example, the client device 280 may send a message comprising an HTTP range request (e.g., a byte range request), to the edge server 274. The HTTP range request may specific that the edge server 274 return a certain byte range of data from a file, e.g., a video chunk. Similar to the HTTP head method, if the edge server 274 does not already possess the video chunk for which the byte range is requested, the edge server 274 may first obtain the video chunk, extract the data associated with the byte range that is requested, and send the data from the byte range to the client device 280. In addition, the edge server 274 will store the video chunk. Thus the HTTP range request may also be used to cause the edge server 274 to obtain and store (e.g., pre-load/edge load) the video chunk. In accordance with the present disclosure, both the HTTP head request and the HTTP range request may be considered requests for a subset of a video chunk.

In accordance with the present disclosure, the client device 280 may utilize any of the above techniques to cause the edge server 274 to preload one or several video chunks associated with a segment of the video program. For instance, in one example, if an encoding bitrate of a current video chunk being played, a next video chunk queued in the video buffer, a last video chunk queued in the video buffer, etc. is an encoding bitrate level M, the client device 280 may send a request to edge server 274 to cause edge server 274 to pre-load video chunks associated with a next segment of the video program, where the video chunks have encoding bitrates levels of M, M−1, and M+1, or M, M−1, M−2, M+1, and M+2, and so forth. Notably, the client device 280 may cause preloading of video chunks for a next segment (or several segments) at a current encoding bitrate level as well as one or several encoding bitrate levels above and/or below a current encoding bitrate level. Thus, if the client device 280 determines that conditions warrant moving to a higher encoding bitrate level, or dropping to a lower encoding bitrate level, if and when the client device 280 requests such video chunks from the edge server 274, the edge server 274 may already possess whichever of the video chunks the client device 280 selects. In one example, the number of video chunks and number of encoding bitrate levels associated with a segment that are requested to be preloaded may be selected by the client device, e.g., based upon the same or different criteria as is used to determine which encoding bitrate level to utilize. Similarly, based upon the same or different criteria the client device 280 may select the number of segments for which video chunks may be requested to be pre-loaded at the same time. In another example, the number of video chunks per segment to be pre-loaded and/or the number of segments for which video chunks are to be requested to be pre-loaded at a same instance may be set by a network operator, by a device manufacturer, by a standards body, by an operator of the CDN 270, etc.

It should be noted that the number of encoding bitrate levels may vary from deployment to deployment. For illustrative purposes, in one example, there may be eight available encoding bitrate levels. Thus, in some cases the client device 280 may request video chunks having a plurality of different encoding bitrates (or bitrate levels) associated with a same segment. However, if an encoding bitrate of a video chunk being played or stored in the video buffer of the client device 280 is at a highest available encoding bitrate level, or a lowest available encoding bitrate level, in one example, the client device 280 may not request pre-loading of a video chunk at an encoding bitrate level of M+1, if already at the highest available encoding bitrate level, or may not request pre-loading of a video chunk at an encoding bitrate level of M−1, if already at a lowest available encoding bitrate level. It should also be noted that the same or a similar process may also be followed with respect to subsequent segments and video chunks of a video program as video chunks are played out of the video buffer of the client device 280 and as the client device 280 seeks to populate the video buffer with additional video chunks of the video program.

In addition, it should be further noted that in another example, the client device 280 may be unmodified, while edge server 274 may be configured to pre-fetching video chunks of a video program, in accordance with the present disclosure. For instance, in another example, client device 280 may request a plurality of video chunks of a video program from edge server 274 in accordance with a manifest file and may begin playing video chunks from a video buffer when the client device 280 determines that the video buffer is at a sufficient level that is anticipated to avoid video stalls. The client device 280 may continue to request video chunks at a same encoding bitrate, at a higher encoding bitrate, or at a lower encoding bitrate for subsequent segments of the video program based upon a variety of criteria, including changing network conditions, CPU capacity, memory capacity, etc., at the client device 280, and so forth. However, is the present example, when edge server 274 receives a request to deliver a video chunk for a particular segment, the edge server 274 may also send requests to origin server 290 and/or other devices in CDN 270 to obtain video chunks for one or more subsequent segments of the video program, e.g., a next segment, the next segment thereafter, etc. In particular, the edge server 274 may request video chunks for the one or more subsequent segments at a current encoding bitrate level, a next lower encoding bitrate level, an next higher encoding bitrate level, etc. Thus, when video chunks of the one or more subsequent segments of the video program are requested by client device 280, the edge server 274 may already possess the video chunks.

In one example, a client device may be directed to an edge server based upon the capabilities of the client device and/or the capabilities of the edge server in accordance with the present disclosure. For instance, if the client device 280 is configured to utilize HTTP head requests or HTTP range requests to cause an edge server to preload video chunks, client device 280 may be assigned to be served by an edge server that does not include additional functionality in accordance with the present disclosure (e.g., edge server 274, in one example). This may be accomplished by origin server 290 and/or server 212 providing client device 280 with a manifest file that points to edge server 274, for instance. Conversely, if client device 280 does not possess such capabilities but edge server 274 is configured to pre-fetch video chunks of a video program, in accordance with the present disclosure, then origin server 290 and/or server 212 may provide client device 280 with a manifest file that points to edge server 274, for example.

The above process(es) helps ensure that video chunks for the next segment, the next two segments, the next three segments, etc., for the current requested bitrate and its adjacent bitrates (or next two higher bitrates and next two lower bitrates, etc.) are available in the edge server 274. From a content delivery perspective, the result is the same as if all video chunks are always in the edge server 274. In one example, based on video start time latency or rebuffering errors, the number of subsequent segments for which video chunks are pre-loaded can be dynamically adjusted. Rebuffering is when the client device 280 is starved for segments and must pause the video playback and wait for a requested video chunk to arrive. Given a drop in a video buffer maintained to a full threshold, the client device 280 may drop the encoding bitrate level and request video chunks of a lower encoding bitrate level, as well as request to edge load video chunks for a greater number of subsequent segments following the current segment. Pre-loading video chunks for a larger "window" of segments at the edge server 274 may help alleviate network issues impacting the rebuffering errors, and may also prevent a drop to a lower encoding bitrate. The "window" sizing or "look-ahead" for the number of subsequent segment(s) can also be reduced when the video buffer is maintained between low buffer and high buffer thresholds. In one example, a minimum floor limit is maintained for the number of subsequent segments to pre-fetch, in order to prevent a situation where the edge server 274 does not have the video chunks before being requested by the client device 280.

In one example, the present disclosure may also adjust the pre-loading/pre-fetching "window", or "look-ahead," based upon the particular video program and historical usage information indicating how long or how much of the video program viewers typically watch before abandoning, for example. Historical information may be gleaned from the CDN 270, from a content provider (e.g., an entity associated with origin server 290), or by a third-party that may aggregate historical usage information from multiple CDNs and/or content providers, which may aggregate and analyze historical usage information on behalf of a network, a content provider, and/or a CDN, and so forth.

In one example, the present disclosure may also adjust the "look-ahead" based upon a viewer profile, e.g., historical data that may indicate that some users are more prone to abandon than others. Thus, an amount of segments for which video chunks are pre-loaded may be adjusted differently for different viewers. Similarly, some viewers may be known to be more sensitive to video/audio quality than other. Thus, in one example, the number of video chunks at adjacent bitrate encoding levels that are pre-loaded may be adjusted depending upon the habits of different viewers. For example, historical data may indicate that a user almost never or almost always abandons if the encoding bitrate (and the corresponding video quality) falls below "X". Therefore, the client device 280 may not request pre-loading and/or the edge server 274 may not pre-fetch bit rates below X, even if such bit rate(s) are adjacent or are M−1 & M−2 below the current encoding bitrate level M. Thus, these and other modifications may be implemented in additional examples of the present disclosure.

FIG. 3 illustrates a flowchart of a method 300 for pre-loading video chunks of a video program at an edge server, in accordance with the present disclosure. In one example, the method 300 is performed by the client device 280 of FIG. 2, any one or more components thereof (e.g., a processor performing operations stored in and loaded from a memory), or by the client device 280 in conjunction with one or more other devices, such as edge server 274, origin server 290, server 212, and so forth. In still another example, the method 400 may be performed by a client device in FIG. 1, such as STB/DVR 162A, STB/DVR 162B, one of the TVs 163A and 163B, PC 166, one of the mobile devices 157A, 157B, 167A, or 167B, and so forth, or any one more components thereof, or by one of these devices in conjunction with other devices and/or components of network 100 of FIG. 1. In one example, the steps, functions, or operations of method 300 may be performed by a computing device or system 500, and/or processor 502 as described in connection with FIG. 5 below. For instance, the computing device or system 500 may represent any one or more components of a client device in FIG. 1 or FIG. 2 that is/are configured to perform the steps, functions and/or operations of the method 300. For illustrative purposes, the method 300 is described in greater detail below in connection with an example performed by a processor, such as processor 502. The method 300 begins in step 305 and proceeds to step 310.

At step 310, the processor receives a manifest file for a video program. In one example, the manifest file identifies a plurality of video chunks associated with a plurality of segments of the video program in accordance with an adaptive bitrate streaming protocol. In one example, the manifest file also identifies an edge server from which the plurality of video chunks may be obtained, e.g., an edge server of a content distribution network (CDN). For instance, for each segment of the plurality of segments, multiple video chunks having a plurality of different bitrates (e.g., encoding bitrates, or encoding bitrate levels) may be made available by an origin server to the edge server. In one example, the manifest file includes URLs for the video chunks that are associated with the edge server. The manifest file may be received from an origin server of the video program or from another network-based server, such as a server of a telecommunication service provider network, a server of a streaming video service provider, and so forth.

At step 320, the processor determines a first bitrate for a first segment of the video program. In one example, processor may select an initial encoding bitrate based upon a variety of factors such as: maximum processor speed, memory capacity, or maximum screen resolution, network conditions, such as latency, bandwidth, throughput, etc., access rights to the video program, an overall length of the video program, and so forth.

At step 330, the processor requests a video chunk of the first segment at the first bitrate from an edge server in accordance with the manifest file. In one example, the processor may request a plurality of video chunks of the video program associated with a plurality of different sequential segments to initially fill a video buffer to a certain occupancy level, e.g., so as to be able to maintain the video buffer occupancy level or to otherwise avoid a stall in the presentation of the video program while playing out video chunks and populating video chunks of subsequent segments from the edge server into the buffer. The one or more video chunks may be encoded at one of a plurality of bitrates (e.g., corresponding to a plurality of encoding bitrate levels in accordance with the adaptive bitrate streaming protocol). For instance, the processor may select a highest available encoding bitrate (or encoding bitrate level) that is calculated to be sustainable for a presentation of the video program in accordance with a variety of criteria, such as network conditions, CPU capacity, memory capacity, access rights to the content, etc. However, it should be noted that in accordance with the method 300, the "first segment" may not necessarily comprise the initial segment of the video program. For instance, the "first segment" may be a segment that is in the middle of a sequence of segments of the video program. It should also be noted that in one example, the edge server may comprise a component of a CDN. However, examples of the present disclosure are not confined to any particular CDN architecture. Thus, in accordance with the present disclosure, an edge server may be any network-based server for delivering content to client devices that is different from an origin server on which video chunks of an adaptive bitrate streaming video program are stored.

At step 340, the processor requests a subset of a video chunk of a second segment of the video program from the edge server. In one example, the subset of the video chunk may comprise a header of the video chunk, or a byte range of the video chunk. For instance, in one example, step 340 may comprise the processor sending an HTTP head request or an HTTP range request to the edge server regarding a URL or other identifier of the video chunk. In another example, the edge server may be configured to receive requests to pre-load or edge load video chunks. Accordingly, in such an example, step 340 may comprise the processor sending a specific request or command to the edge server to pre-load/edge load the video chunk (if not already stored at the edge server). In one example, the video chunk of the second segment of the video program is encoded at one of a plurality of bitrates (e.g., corresponding to a plurality of bitrate encoding levels in accordance with the adaptive bitrate streaming protocol).

Regardless of the manner in which the request is made, the requesting the subset of the video chunk of the second segment of the video program from the edge server may cause the edge server to obtain the video chunk of the second segment of the video program, e.g., from an origin server or another component of a CDN, and store the video chunk of the second segment of the video program at the edge server, when the edge server does not already possess the video chunk. In addition, the requesting the subset of the video chunk of the second segment of the video program from the edge server may cause the edge server to send the subset of the video chunk of the second segment of the video program to the device. At least a portion of the video chunk of the second segment is not sent by the edge server to the device in response to the processor requesting the subset of the video chunk of the second segment of the video program from the edge server. In one example, the processor may store the subset of the video chunk of the second segment, e.g., for later aggregation with a remaining portion of the video chunk when the processor may request the video chunk from the edge server. However, in another example, the processor may simply ignore or discard the subset of the video chunk of the second segment that may be sent by the edge server in response to the request that is made at step 340. Following step 340, the method 300 may proceed to optional step 350 or may proceed to step 395.

At optional step 350, the processor may request a subset of a second video chunk of the second segment of the video program. The second video chunk of the second segment of the video program may be encoded at a second bitrate of the plurality of bitrates. For example, the second bitrate of the plurality of bitrates may comprise a bitrate that is a next higher bitrate or a next lower bitrate to the first bitrate within a range of encoding bitrate levels at which the segments of the video program are encoded into different video chunks. It should be noted that in one example, optional step 350 may comprise requesting subsets of a plurality of video chunks of the second segment of the video program. For instance, the processor may cause preloading of video chunks for a next segment (or several segments) at a current encoding bitrate level as well as one or several encoding bitrate levels above and/or below a current encoding bitrate level.

At optional step 360, the processor may receive the video chunk of the first segment from the edge server. In accordance with the present disclosure, the edge server may have pre-loaded the video chunk such that the video chunk may be received by the processor without having to wait for the edge server to obtain the video chunk from an origin server or from other components of a CDN in response to the request sent at step 330.

At optional step 370, the processor may play the video chunk of the first segment at the device. For instance, the processor may de-queue the video chunk from the video buffer and present the video chunk via a display and/or a speaker, headphone(s), etc. associated with the device of the processor. Following step 340, or one of optional steps 350-370, the method 300 proceeds to step 395 where the method ends.

FIG. 4 illustrates a flowchart of a method 400 for pre-fetching video chunks of a video program, in accordance with the present disclosure. In one example, the method 400 is performed by the edge server 274 of FIG. 2, any one or more components thereof (e.g., a processor performing operations stored in and loaded from a memory), or by the edge server 274 in conjunction with one or more other devices, such as origin server 290, ingress server 272, and so forth. In still another example, the method 400 may be performed by edge server 174 in FIG. 1 or any one more components thereof, or by edge server 174 in conjunction with other devices and/or components of network 100 of FIG. 1. In one example, the steps, functions, or operations of method 400 may be performed by a computing device or system 500, and/or processor 502 as described in connection with FIG. 5 below. For instance, the computing device or system 500 may represent any one or more components of an edge server in FIG. 1 or FIG. 2 that is/are configured to perform the steps, functions, and/or operations of the method 400. For illustrative purposes, the method 400 is described in greater detail below in connection with an example performed by a processor, such as processor 502. The method 400 begins in step 405 and proceeds to step 410.

At step 410, the processor receives, from a client device, a request for a video chunk of a first segment of a video program, wherein the video chunk of the first segment of the video program is encoded at a first bitrate. In one example, for each segment of the plurality of segments, multiple video chunks having a plurality of different bitrates (e.g., encoding bitrates, or encoding bitrate levels) may be made available by an origin server to the processor, e.g., where the processor is a processor of an edge server, such as an edge server of a CDN. In one example, the first segment may comprise an initial segment of the video program. In another example, the first segment may comprise a segment from the middle of a sequence of segments of the video program.

At step 420, the processor retrieves the video chunk of the first segment of the video program in response to the request for the video chunk of the first segment of the video program. In one example, the processor may retrieve the video chunk from a local storage, e.g., at or within the device of the processor. For instance, the device may comprise an edge server of a CDN that may already possess the video chunk. For example, the same or a different client device may have already requested the video chunk, and the video chunk may have been retained locally according to a least recently used (LRU) algorithm, or the like. If, however, the video chunk is not already available locally, the processor may retrieve the video chunk of the first segment from a source device such as an origin server that may store the video chunks of the video program. In another example, the source device may comprise another component of a CDN, such as an ingress server, a mid-tier server, a peer edge server, etc.

At step 430, the processor retrieves a plurality of video chunks of at least a second segment of the video program at a plurality of bitrates from a source device in response to the request for the video chunk of the first segment of the video program. In particular, in accordance with the present disclosure, the processor may pre-load/edge load video chunks of one or more subsequent segments of the video program in response to a request for the video chunk of the first segment. The video chunks of the at least the second segment may be encoded at one of the plurality of bitrates, including a same bitrate as the video chunk of the first segment, a bitrate of a next higher encoding bitrate level and/or a bitrate of a next lower encoding bitrate level according to an adaptive bitrate streaming protocol. In one example, the number of video chunks for the at least the second segment (e.g., the number of encoding bitrate levels) may be selected by the client device, by a content originator, a telecommunication service provider, a streaming video service provider, an operation of a CDN, etc., or may be set according to a protocol or standards body. In addition, the number of segments of the at least a second segment may also be selected by any of the abovementioned entities, or a different entity.

At step 440, the processor transmits the video chunk of the first segment of the video program to the client device. In one example, steps 430 and 440 may occur in parallel or at substantially the same time.

At step 450, the processor stores the plurality of video chunks of the at least the second segment of the video program at the device. Notably, the plurality of video chunks may be stored locally at the device in anticipation of the client device requesting one or more of the video chunks.

At optional step 460, the processor may receive, from the client device, a request for a video chunk of second segment of the video program at one of the plurality of bitrates. Again, the plurality of video chunks may be stored locally at the device in anticipation of the client device requesting one or more of the video chunks. Thus, at optional step 460, the video chunk of the second segment may be accessed faster than if the processor had to retrieve the video chunk from another location. The one of the plurality of bitrates may be a same bitrate as the video chunk of the first segment, or may be a different bitrate, such as a bitrate of a next higher encoding bitrate level or a bitrate of a next lower encoding bitrate level according to an adaptive bitrate streaming protocol.

At optional step 470, the processor may transmit the video chunk of the second segment of the video program at the one of the plurality of bitrates that is stored at the device to the client device.

At optional step 480, the processor may retrieve a plurality of video chunks of at least a third segment of the video program from the source device in response to the request for the video chunk of the second segment of the video program at the one of the plurality of bitrates. In one example, optional step 470 may comprise retrieving the plurality of video chunks of the at least the third segment of the video program at a second plurality of bitrates from the source device. In addition, in one example, the storing the at least the third segment of the video program comprises storing the at least the third segment of the video program at the second plurality of bitrates at the device. The second plurality of bitrates may comprise, for example, the one of the plurality of bitrates for the video chunk of the second segment of the video program plus bitrates of a next higher and/or a next lower encoding bitrate level, the next two higher and/or next two lower encoding bitrate levels, etc.

At optional step 490, the processor may store the plurality of video chunks of the at least the third segment of the video program at the device. Thus, the plurality of video chunks of the at least the third segment of the video program may be locally available to the processor in anticipation of a request from the client device for one of the video chunks of the at least the third segment. Following step 450, or one of optional steps 460-490, the method 400 proceeds to step 495 where the method ends.

In addition, although not expressly specified above, one or more steps of the method 300 or the method 400 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 or FIG. 4 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 5 depicts a high-level block diagram of a computing device specifically programmed to perform the functions described herein. For example, any one or more components or devices illustrated in FIG. 1 or described in connection with the method 300 or the method 400 may be implemented as the system 500. As depicted in FIG. 5, the system 500 comprises a hardware processor element 502 (e.g., a microprocessor, a central processing unit (CPU) and the like), a memory 504, (e.g., random access memory (RAM), read only memory (ROM), a disk drive, an optical drive, a magnetic drive, and/or a Universal Serial Bus (USB) drive), a module 505 for pre-loading video chunks of a video program at an edge server and/or for pre-fetching video chunks of a video program, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one embodiment, instructions and data for the present module or process 505 for pre-loading video chunks of a video program at an edge server and/or for pre-fetching video chunks of a video program (e.g., a software program comprising computer-executable instructions) can be loaded into memory 504 and executed by hardware processor element 502 to implement the steps, functions or operations as discussed above in connection with the example method 300 or the example method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for pre-loading video chunks of a video program at an edge server and/or for pre-fetching video chunks of a video program (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A device comprising:
   a processor; and
   a non-transitory computer-readable medium storing instructions which, when executed by the processor, cause the processor to perform operations, the operations comprising:
     receiving a manifest file for a video program;
     determining a first bitrate for a first segment of the video program;
     requesting a video chunk of the first segment at the first bitrate from an edge server in accordance with the manifest file; and
     requesting a subset of a video chunk of a second segment of the video program from the edge server, wherein the requesting the subset of the video chunk of the second segment of the video program comprises sending a range request to the edge server.

2. The device of claim 1, wherein the manifest file identifies a plurality of video chunks associated with a plurality of segments of the video program in accordance with an adaptive bitrate streaming protocol.

3. The device of claim 2, wherein for each segment of the plurality of segments, multiple video chunks having different bitrates are made available by a source device to the edge server.

4. The device of claim 1, wherein a uniform resource locator for the video chunk of the first segment and a uniform resource locator for the video chunk of the second segment are identified in the manifest file, wherein the uniform resource locator for the video chunk of the first segment and the uniform resource locator for the video chunk of the second segment are both associated with the edge server.

5. The device of claim 1, wherein the edge server comprises an edge server of a content distribution network.

6. The device of claim 1, wherein the requesting the subset of the video chunk of the second segment of the video program from the edge server causes the edge server to:
   obtain the video chunk of the second segment of the video program;
   store the video chunk of the second segment of the video program at the edge server; and
   send the subset of the video chunk of the second segment of the video program to the device.

7. The device of claim 6, wherein at least a portion of the video chunk of the second segment is not sent by the edge server to the device in response to the device requesting the subset of the video chunk of the second segment of the video program from the edge server.

8. The device of claim 1, wherein the operations further comprise:
   receiving the video chunk of the first segment from the edge server; and
   playing the video chunk of the first segment at the device.

9. The device of claim 1, wherein the video chunk of the second segment of the video program is encoded at one of a plurality of bitrates.

10. The device of claim 9, wherein the operations further comprise:
    requesting a subset of a second video chunk of the second segment of the video program, wherein the second video chunk of the second segment of the video program is encoded at a second bitrate of the plurality of bitrates.

11. The device of claim 10, wherein the one of the plurality of bitrates comprises the first bitrate, wherein the second bitrate of the plurality of bitrates comprises a bitrate that is a next higher bitrate or a next lower bitrate to the first bitrate within the plurality of bitrates.

12. The device of claim 1, wherein the range request comprises a hypertext transfer protocol range request.

13. A non-transitory computer-readable medium storing instructions which, when executed by a processor, cause the processor to perform operations, the operations comprising:
    receiving a manifest file for a video program;
    determining a bitrate for a first segment of the video program;
    requesting a video chunk of the first segment at the first bitrate from an edge server in accordance with the manifest file; and
    requesting a subset of a video chunk of a second segment of the video program from the edge server, wherein the requesting the subset of the video chunk of the second segment of the video program comprises sending a range request to the edge server.

14. A device comprising:
    a processor; and
    a non-transitory computer-readable medium storing instructions which, when executed by the processor, cause the processor to perform operations, the operations comprising:
      receiving, from a client device, a request for a video chunk of a first segment of a video program, wherein the video chunk of the first segment of the video program is encoded at a first bitrate;
      retrieving the video chunk of the first segment of the video program, in response to the request for the video chunk of the first segment of the video program;
      receiving, from the client device, a request for a subset of a video chunk of a second segment of the video program, the request comprising a range request;
      retrieving the video chunk of the second segment of the video program, in response to the request for the subset of the video chunk of the second segment of the video program;
      transmitting the video chunk of the first segment of the video program to the client device; and
      storing the video chunk of the second segment of the video program at the device.

15. The device of claim 14, wherein the operations further comprise:
    receiving, from the client device, a request for the video chunk of the second segment of the video program;
    transmitting the video chunk of the second segment of the video program that is stored at the device to the client device;
    retrieving a plurality of video chunks of at least a third segment of the video program from the source device in response to the request for the video chunk of the second segment of the video program; and storing the plurality of video chunks of the at least the third segment of the video program at the device.

16. The device of claim 15, wherein the retrieving the plurality of video chunks of the at least the third segment of the video program from the source device in response to the request for the video chunk of the second segment of the video program comprises retrieving the plurality of video chunks of the at least the third segment of the video program encoded at a plurality of bitrates from the source device, wherein the storing the plurality of video chunks of the at least the third segment of the video program comprises storing the plurality of video chunks of the at least the third segment of the video program at the plurality of bitrates at the device.

17. The device of claim 14, wherein the receiving the request comprises receiving a plurality of requests for subsets of a plurality of video chunks of the second segment of the video program, the plurality of requests comprising hypertext transfer protocol range requests.

18. The device of claim 17, wherein video chunks of the plurality of video chunks of the second segment of the video program comprise bitrate variants of each other.

19. The device of claim 17, wherein the retrieving comprises retrieving the plurality of video chunks of the second segment of the video program, in response to the plurality of requests for the subsets of the plurality of video chunks of the second segment of the video program.

20. The device of claim 19, wherein the storing comprises storing the plurality of video chunks of the second segment of the video program at the device.

* * * * *